(12) United States Patent
Tal

(10) Patent No.: US 8,862,819 B2
(45) Date of Patent: Oct. 14, 2014

(54) LOG STRUCTURE ARRAY

(75) Inventor: Doron Tal, Haifa (IL)

(73) Assignee: Kaminario Technologies Ltd., Yokne'Am Ilit (IL)

( * ) Notice: Subject to any disclaimer, the term of this patent is extended or adjusted under 35 U.S.C. 154(b) by 200 days.

(21) Appl. No.: 13/638,096

(22) PCT Filed: Mar. 31, 2011

(86) PCT No.: PCT/IL2011/000286
§ 371 (c)(1),
(2), (4) Date: Sep. 28, 2012

(87) PCT Pub. No.: WO2011/121590
PCT Pub. Date: Oct. 6, 2011

(65) Prior Publication Data
US 2013/0024618 A1   Jan. 24, 2013

Related U.S. Application Data

(60) Provisional application No. 61/319,357, filed on Mar. 31, 2010.

(51) Int. Cl.
*G06F 13/00* (2006.01)
*G06F 3/06* (2006.01)

(52) U.S. Cl.
CPC ............ *G06F 13/00* (2013.01); *G06F 3/0643* (2013.01); *G06F 3/065* (2013.01); *G06F 3/061* (2013.01); *G06F 3/0685* (2013.01)
USPC ............................. 711/114; 711/154; 711/162

(58) Field of Classification Search
USPC .......................................... 711/114, 154, 162
See application file for complete search history.

(56) References Cited

U.S. PATENT DOCUMENTS

| 5,671,390 | A | 9/1997 | Brady et al. |
|---|---|---|---|
| 6,490,664 | B1 | 12/2002 | Jones et al. |
| 7,685,360 | B1 | 3/2010 | Brunnett et al. |
| 7,822,731 | B1 * | 10/2010 | Yu et al. ........................ 707/705 |
| 2002/0032835 | A1 | 3/2002 | Li et al. |
| 2002/0118582 | A1 | 8/2002 | Butterworth et al. |
| 2003/0065876 | A1 | 4/2003 | Lasser |
| 2006/0020745 | A1 | 1/2006 | Conley et al. |
| 2008/0259764 | A1 | 10/2008 | Bates et al. |
| 2011/0208933 | A1 * | 8/2011 | Selfin et al. .................... 711/162 |

FOREIGN PATENT DOCUMENTS

WO   WO 2010/049929 A1   5/2010

* cited by examiner

*Primary Examiner* — Reba I Elmore
(74) *Attorney, Agent, or Firm* — Wiggin and Dana LLP; Gregory S. Rosenblatt

(57) ABSTRACT

A storage system, comprising: (a) a primary storage entity utilized for persistently storing an entire data-set; (b) a secondary storage entity; and (c) a secondary storage controller ("SSC") responsive to a destage stream pending to be written to the second storage entity for identifying a succession of physical locations on the secondary storage entity formed by non-protected locations in an extent that is sufficient to accommodate the destage stream and one or more intervening protected locations between two or more of the non-protected locations; wherein said SSC is adapted to retrieve from said primary storage entity protected data associated with the intervening protected location(s), pad the stream of data with the protected data and write the padded stream of data to said secondary storage entity as a single successive write sequence over said succession of physical locations.

43 Claims, 6 Drawing Sheets

LOG STRUCTURE ARRAY

FIELD OF INVENTION

The present invention relates generally to a multi-layer storage system and a method of managing thereof.

LIST OF REFERENCES

The following references are considered to be pertinent for the purpose of understanding the background of the present invention:

United States patent application publication serial number US2002118582A.

U.S. Pat. No. 6,490,664B.

U.S. Pat. No. 5,671,390A.

BACKGROUND

A log structured file system implements a dynamic approach for writing data to storage medium. In principal, a log structured file system writes all modifications to disk sequentially in a log-like structure. For non-solid state storage media which usually prefer sequential access and sequential write in particular a log structured file system may be beneficial. It is now also believed that at least some solid data storage media prefer sequential access and sequential write in particular, and therefore could also benefit from a log structured file system.

Generally, as an LSA managed hard disk drive (HDD) becomes full, the number and extent of seeks required to locate available storage space increases—adversely impacting performance. In other words, for a current implementation of a log structured file system to operate efficiently, it must ensure that there are always large extents of free space available for writing new data.

SUMMARY OF THE INVENTION

The present invention relates to a storage system. In some embodiments, the storage system is a multi-tiered storage system. In further embodiments, the multi-tiered storage system is heterogeneous. In still further embodiments, the storage system includes a primary storage entity, a secondary storage entity and a secondary storage controller (SSC"). The primary storage entity is utilized for persistently storing an entire data-set. The secondary storage controller ("SSC") is responsive to a destage stream pending to be written to the second storage entity for identifying a succession of physical locations on the secondary storage entity that is formed by non-protected locations in an extent that is sufficient to accommodate the destage stream and one or more intervening protected locations between two or more of the non-protected locations. The SSC is adapted to retrieve from the primary storage entity protected data associated with the intervening protected location(s), pad the stream of data with the protected data and write the padded stream of data to the secondary storage entity as a single successive write sequence over the succession of physical locations.

According to further embodiments, the primary storage entity is used for servicing I/O's addressed to the storage system and the secondary storage entity is utilized for storing a copy of at least a portion of the data set within the first storage entity.

According to still further embodiments, the primary storage entity is characterized by relatively fast I/O performance and the secondary storage entity is characterized by relatively slow I/O performance.

According to yet further embodiments, the primary storage entity is characterized by relatively fast I/O performance, particularly when servicing random access ("RA") I/Os, and the secondary storage entity's performance is particularly poor when servicing RA I/Os.

According to still further embodiments, an aggregate size of the non-protected storage locations is large enough to accommodate the storage of the stream of data blocks.

According to further embodiments, the SSC is adapted to search for the sequential storage area ahead of a current location position or ahead of a last known position of a read/write mechanism of the secondary storage entity.

According to still further embodiments, during normal operation of the storage system, the secondary storage entity is addressed with write requests only.

According to further embodiments, the SSC is configured to implement a log structured file system ("LFS") for managing data stored on the secondary storage entity.

According to further embodiments, the primary storage entity comprises a plurality of data retention devices and the data set is distributed across the plurality of data retention devices.

According to further embodiments, the primary storage entity comprises a single data retention device.

According to yet further embodiments, the secondary storage entity comprises a single data retention device.

According to further embodiments, the SSC is configured to position the protected data at the start or at the end of the padded stream, thereby causing the protected data to be repositioned within the secondary storage entity.

According to further embodiments, the SSC is adapted to search for a sequential storage area within which a density of protected data is below a certain threshold.

According to yet further embodiments, the SSC is adapted to search for a sequential storage area within which a density of protected data is lowest relative to other areas within which an aggregate size of non-protected storage locations is large enough to accommodate the storage of the stream of data blocks.

According to still further embodiments, the SSC is adapted to bring the search for the sequential storage area at any point within the secondary storage entity, and in any direction relative to a current location or a last known position of a read/write mechanism of the secondary storage entity.

According to an aspect of the invention, a method for managing a multilayered storage system is disclosed. The method may be used for the managing of a multilayered system such as the one disclosed above, but this is not necessarily so. The disclosed method includes: (i) identifying on a secondary storage entity a succession of physical locations formed by: (a) non-protected locations in an extent that is sufficient to accommodate a destage stream that is pending to be written to the second storage entity; and (b) one or more intervening protected locations between two or more of the non-protected locations; (ii) retrieving protected data associated with the one or more intervening protected location from a primary storage entity that is utilized for persistently storing an entire data-set; (iii) padding the stream of data with the protected data; and (iv) writing the padded stream of data to the secondary storage entity as a single successive write sequence over the succession of physical locations.

The retrieving may comprise retrieving the protected data from the primary storage entity which is used for servicing I/O's addressed to the storage system, and the writing may comprise writing the padded stream of data to the secondary storage entity which is utilized for storing a copy of at least a portion of the data set within the first storage entity.

The retrieving may comprise retrieving the protected data from the primary storage entity which is characterized by relatively fast I/O performance; and the writing may comprise writing the padded stream of data to the secondary storage entity which is characterized by relatively slow I/O performance.

The retrieving may comprise retrieving the protected data from the primary storage entity which is characterized by relatively fast I/O performance, particularly when servicing random access ("RA") I/Os, and the writing may comprise writing the padded stream of data to the secondary storage entity whose performance is particularly poor when servicing RA I/Os.

The identifying may comprise identifying the succession of physical locations so that an aggregate size of said non-protected storage locations is large enough to accommodate the storage of the stream of data blocks.

The method may comprise searching for said sequential storage area ahead of a current location position or ahead of a last known position of a read/write mechanism of said secondary storage entity.

The method may further comprise managing data stored on the secondary storage entity by implementing a log structured file method ("LFS").

The retrieving may comprise retrieving the protected data from the primary storage entity that may comprise a plurality of data retention devices and the data set is distributed across the plurality of data retention devices.

The retrieving may comprise retrieving the protected data from the primary storage entity that may comprise a single data retention device.

The writing may comprise writing the padded stream of data to the secondary storage entity that may comprise a single data retention device.

The padding may comprise positioning the protected data at the start or at the end of the padded stream, thereby causing the protected data to be repositioned within said secondary storage entity.

The identifying may comprise searching for a sequential storage area within which a density of protected data is below a certain threshold.

The identifying may comprise searching for a sequential storage area within which a density of protected data is lowest relative to other areas within which an aggregate size of non-protected storage locations is large enough to accommodate the storage of the stream of data blocks.

The identifying may comprise bringing the search for said sequential storage area at any point within said secondary storage entity, and in any direction relative to a current location or a last known position of a read/write mechanism of said secondary storage entity.

According to an embodiment of the invention, a computer readable storage medium having computer readable program embodied therein for managing a multilayered storage system is disclosed. That multilayered storage system may be the multilayered storage system disclosed above, but this is not necessarily so. The computer readable code comprise instructions for: (i) identifying on a secondary storage entity a succession of physical locations formed by: (a) non-protected locations in an extent that is sufficient to accommodate a destage stream that is pending to be written to the second storage entity; and (b) one or more intervening protected locations between two or more of the non-protected locations; (ii) retrieving protected data associated with the one or more intervening protected location from a primary storage entity that is utilized for persistently storing an entire data-set; (iii) padding the stream of data with the protected data; and (iv) writing the padded stream of data to the secondary storage entity as a single successive write sequence over the succession of physical locations.

The instructions for retrieving may comprise instructions for retrieving the protected data from the primary storage entity which is used for servicing I/O's addressed to the storage system, and wherein the instructions for writing may comprise instructions for writing the padded stream of data to the secondary storage entity which is utilized for storing a copy of at least a portion of the data set within the first storage entity.

The instructions for retrieving may comprise instructions for retrieving the protected data from the primary storage entity which is characterized by relatively fast I/O performance; and wherein the instructions for writing may comprise instructions for writing the padded stream of data to the secondary storage entity which is characterized by relatively slow I/O performance.

The instructions for retrieving may comprise instructions for retrieving the protected data from the primary storage entity which is characterized by relatively fast I/O performance, particularly when servicing random access ("RA") I/Os, and wherein the instructions for writing may comprise instructions for writing the padded stream of data to the secondary storage entity whose performance is particularly poor when servicing RA I/Os.

The instructions for identifying may comprise instructions for identifying the succession of physical locations so that an aggregate size of said non-protected storage locations is large enough to accommodate the storage of the stream of data blocks.

The computer readable code may comprise instructions for searching for said sequential storage area ahead of a current location position or ahead of a last known position of a read/write mechanism of said secondary storage entity.

The computer readable code further may comprise managing data stored on the secondary storage entity by implementing a log structured file method ("LFS").

The instructions for retrieving may comprise instructions for retrieving the protected data from the primary storage entity that may comprise a plurality of data retention devices and the data set is distributed across the plurality of data retention devices.

The instructions for retrieving may comprise instructions for retrieving the protected data from the primary storage entity that may comprise a single data retention device.

The instructions for writing may comprise instructions for writing the padded stream of data to the secondary storage entity that may comprise a single data retention device.

The instructions for padding may comprise instructions for positioning the protected data at the start or at the end of the padded stream, thereby causing the protected data to be repositioned within said secondary storage entity.

The instructions for identifying may comprise instructions for searching for a sequential storage area within which a density of protected data is below a certain threshold.

The instructions for identifying may comprise instructions for searching for a sequential storage area within which a density of protected data is lowest relative to other areas within which an aggregate size of non-protected storage locations is large enough to accommodate the storage of the stream of data blocks.

The instructions for identifying may comprise instructions for bringing the search for said sequential storage area at any point within said secondary storage entity, and in any direction relative to a current location or a last known position of a read/write mechanism of said secondary storage entity.

BRIEF DESCRIPTIONS OF THE DRAWINGS

In order to understand the invention and to see how it may be carried out in practice, a preferred embodiment will now be described, by way of non-limiting example only, with reference to the accompanying drawings, in which.

Figure 5:
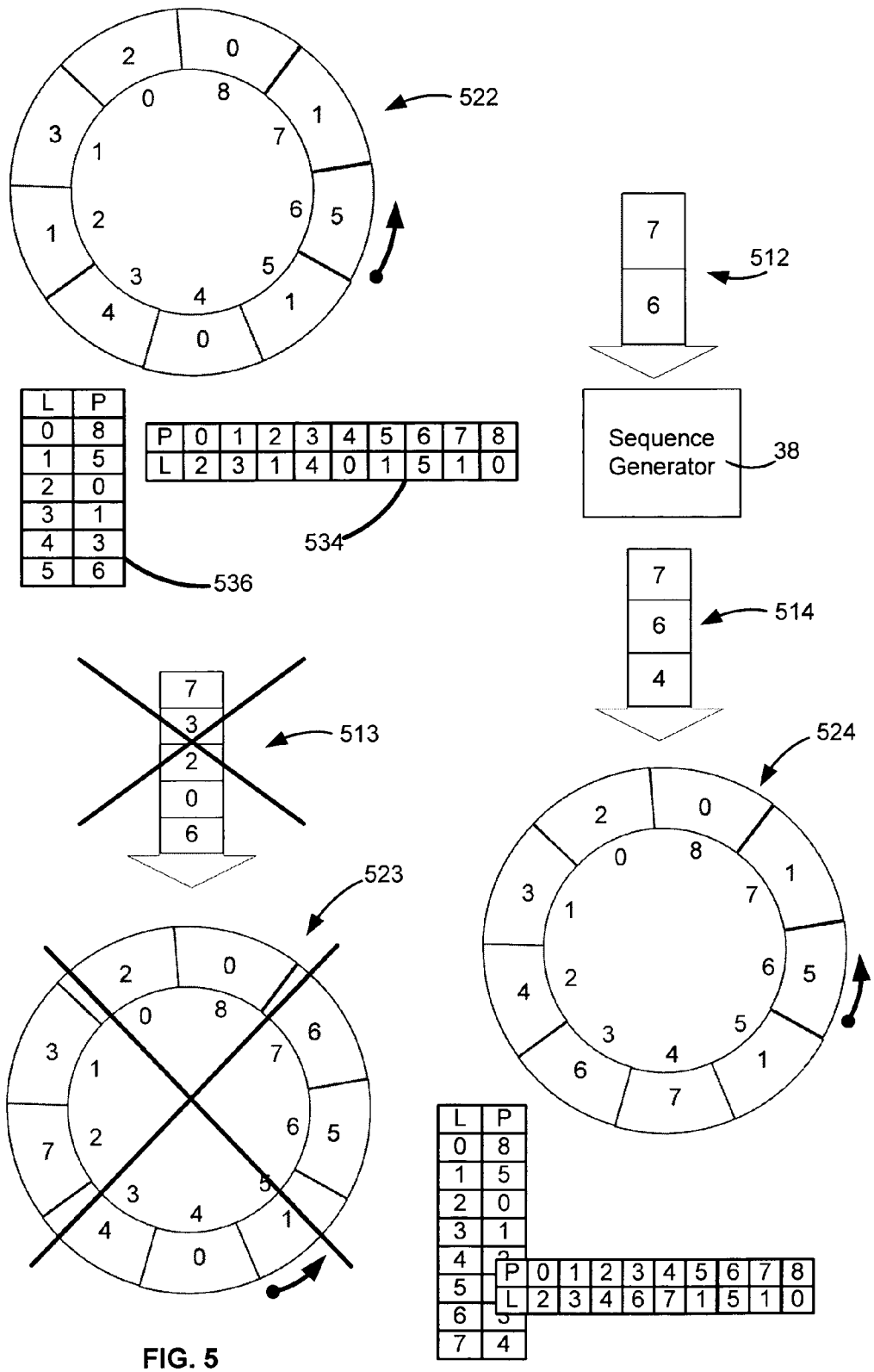
Figure 6:
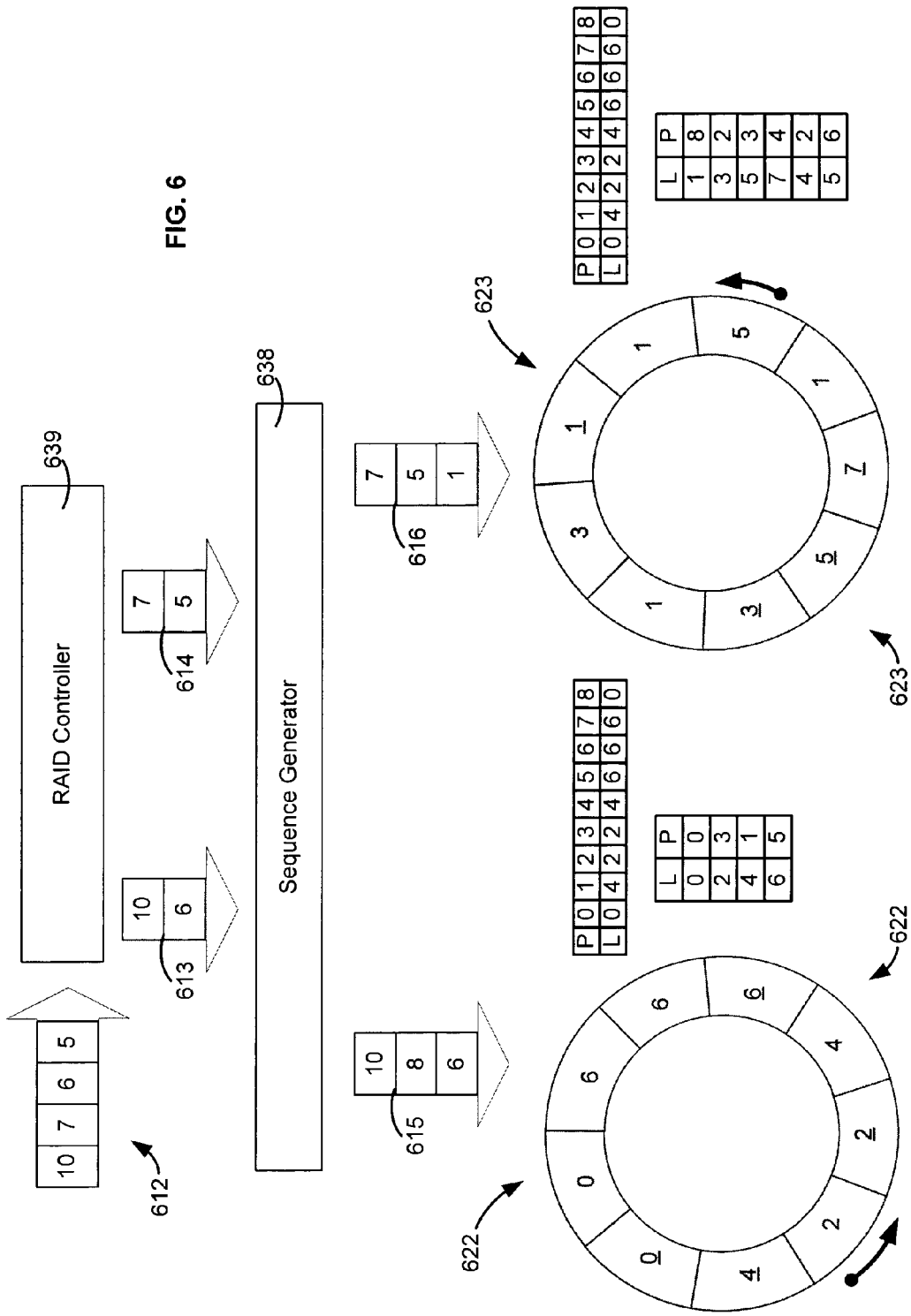

FIG. 5 is an example of a process of locating an area of successive physical blocks on a secondary storage entity which includes non-protected storage locations in an extent that is sufficient to accommodate 'new' data that is pending to be destaged, and which is fragmented by at least one intervening protected storage location; and FIG. 6 is an example of a process of locating an area of successive physical blocks on a secondary storage entity which includes non-protected storage locations in an extent that is sufficient to accommodate 'new' data that is pending to be destaged, and which is fragmented by at least one intervening protected storage location.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

As part of the description of some embodiments of the present invention, reference is made to the term "block device". The term block device as used herein relates to data retention units whose physical storage resources are managed through a block-wise abstraction, so that storing and retrieving data on or from the block device is made with reference to specified blocks of data. In order to provide a better distinction between a logical storage block and a physical storage block, in the description of some embodiments of the present invention, logical storage blocks are referred to as "logical storage addresses" (or logical storage address in the singular) and physical storage blocks are referred to as "physical storage locations (or physical storage location in the singular). In a block device, each block is a physical storage location, and the sub-block resources cannot are not provisioned by the file-system.

As part of the description of the certain embodiments of the invention, reference is made to the terms "dirty data blocks" and "dirty data". The terms "dirty data blocks" or "dirty data" are known in the art and the following definition is provided for convenience purposes. In a storage system utilizing primary storage for storing the storage system's data-set and a secondary storage for storing backup data, dirty data refers to any data written to a primary storage which is yet to be copied to a secondary backup storage. This type of data is referred to as the "dirty data" not because of its 'correctness' (or because it is not 'correct'), but rather because of the temporary unconformity between information in the primary storage and in the secondary storage. Dirty data exists in particular when the backup strategy implemented by the system is asynchronous with the storage of the data within the primary storage.

Figure 1:
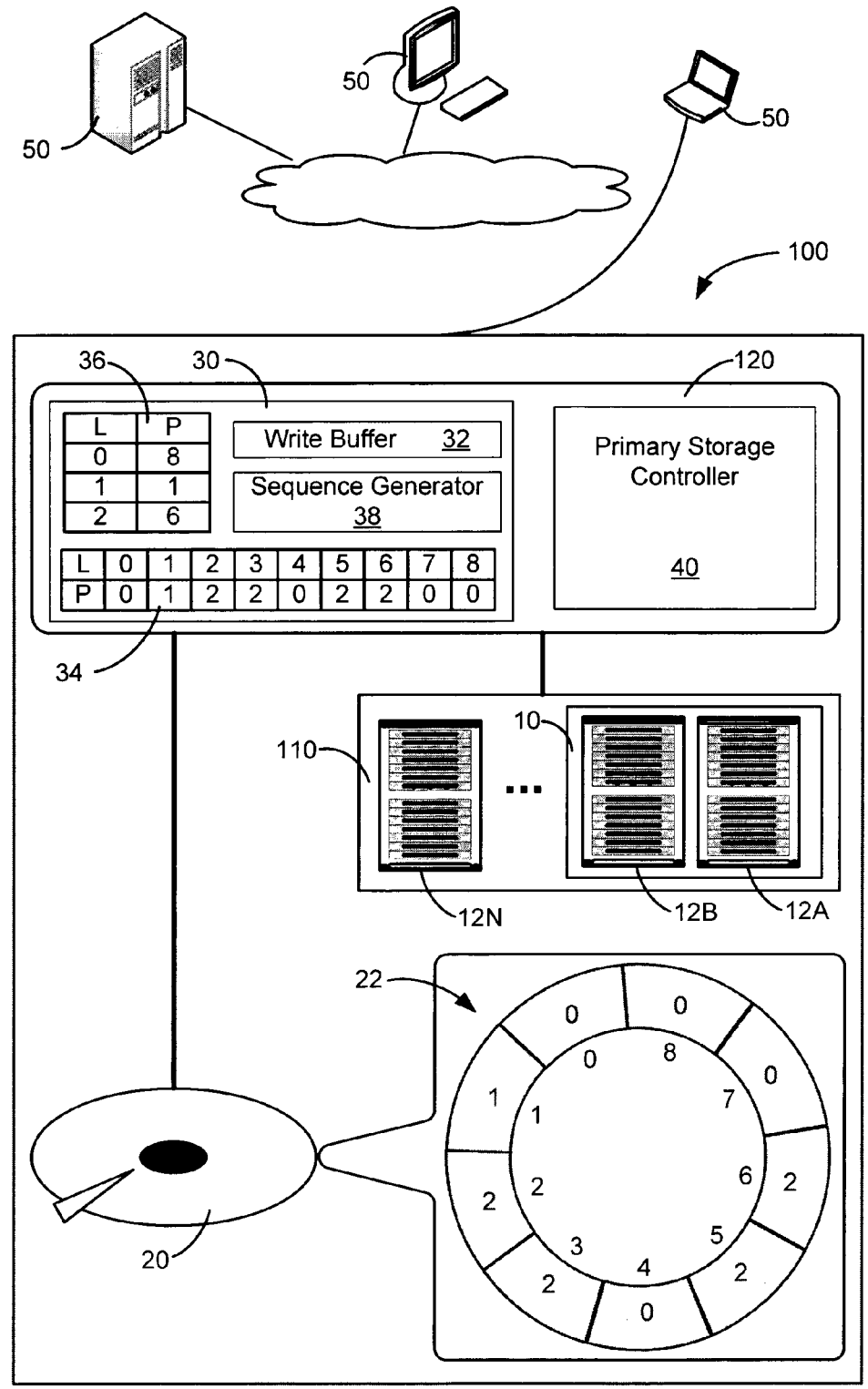
FIG. 1 is a block diagram illustration of storage system according to some embodiments of the present invention.

Reference is now made to FIG. 1 which is a block diagram illustration of storage system according to some embodiments of the present invention. According to some embodiments, and as is shown by way of example in FIG. 1, the storage system 100 may include a primary storage entity 10, a secondary storage entity 20, and a secondary storage controller ("SSC") 30. By way of example, the storage system 100 is a mass storage system and is used for servicing a plurality of hosts 50 which are operatively connected to the system 100. According to some embodiments, the hosts may issue requests to write and read data to and from the storage system 100, and the storage system 100 may be configured to service the requests. It would be appreciated that the storage system 100 may be responsive to other types of I/O requests and from other sources.

According to some embodiments, the storage system 100 is a multi-layered storage system. The storage system includes a primary storage layer 100 and a secondary storage layer (not shown). The primary storage entity 10 is part of the primary storage layer 110 and the secondary storage entity 20 is part of the secondary storage layer. In some embodiments, the primary storage layer 110 provides physical storage locations which are mapped to corresponding logical storage addresses, and the logical storage addresses are provisioned by the storage system 100. For example, the logical storage addresses may be provisioned to the hosts 50 associated with the storage system 100, and may be used to enable data input and output operations with the system 100. Accordingly, in some embodiments, the primary storage layer 110 provides the entire address space provisioned by the storage system 100 and is used for storing the entire data set of the storage system 100.

In some embodiments, the primary storage entity 10 may constitute the entire primary storage layer 110, however, in further embodiments, and as is shown in FIG. 1, the primary storage entity 10 may include a subset of the primary storage layer 110. For example, the primary storage layer 110 may be comprised of data retention units 12A-12N, the primary storage entity 10 may be comprised of data retention units 12A and 12B. It would be appreciated that within the storage system of the present invention, data retention units 12A and 12B allocate certain physical storage locations which are mapped to certain logical storage addresses. The logical storage addresses mapped to the physical storage locations allocated by data retention units 12A and 12B constitute a certain segment of the address space provisioned by the storage system 100. Thus, for example, when a host 50 issues a write request referencing a logical storage address that is mapped to a physical storage location on data retention unit 12A, the write request is serviced by writing data to the physical storage location within data retention unit 12A that is associated with the logical storage address referenced by the write request. Similarly, read requests referencing a logical storage address that is mapped to physical storage locations on data retention unit 12B are serviced by accessing the respective physical storage locations within data retention unit 12B. It follows that an entire data-set within a specific segment of the address space of the storage system 100 is stored on data retention units 12A and 12B. Accordingly, in the following description and in the claims the primary storage entity 10 is characterized as being the storage entity on which an entire data-set is stored.

In some embodiments, the secondary storage entity 20 is utilized for storing a copy of at least a portion of the data set within the first storage entity 10. Thus, by way of example, in the system 100 shown in FIG. 1, the secondary storage entity may be the data retention unit 20 that is used to backup the primary storage entity 10, which is in this case, comprised of data retention units 12A and 12B. The physical storage locations of the secondary storage entity 20 may be mapped to the logical storage addresses associated with data retention units 12A and 12B. In further embodiments, the physical storage locations of the secondary storage entity 20 may be mapped to the physical storage locations on data retention units 12A and 12B.

For simplicity, the secondary storage entity 20 shown in FIG. 1 is a disk. However, it would be appreciated that further embodiments of the invention may implemented with respect to any block storage device or group of devices, including, but not limited to RAIDed disks, Flash disks (including RAIDed) etc. Similarly, the secondary storage entity 20 may include a single data retention unit or several data retention units. The application of the teachings of some embodiments of the present invention to RAID groups which serve as the secondary storage entity is discussed in further detail below.

In some embodiments, the storage system 100 is a heterogeneous storage system, and the primary storage entity 10 has an I/O performance advantage over the secondary storage entity 20. In still further embodiments, the primary storage entity 10 provides a relatively high I/O performance in data writes. In still further embodiments, for random access I/O the primary storage entity 10 has a performance advantage over the secondary storage entity 20. In yet further embodiments, the secondary storage entity 20 provides better performance when servicing sequential I/Os relative to its own performance when servicing random I/Os. By way of example, the primary storage entity 10 is based on volatile storage units and the secondary storage entity 20 is based on hard disk drives. A system using volatile data retention units for persistently storing data is described in U.S. Provisional No. 61/193,079 filed on Oct. 27, 2008 and in PCT application No. IL2009/001005 filed Oct. 27, 2009, both of which are hereby incorporated by referenced. In addition, the use of volatile data retention units for persistently storing data shall also be described below.

A log structured file system may be implemented for managing the storage of data within the secondary storage entity 20. Various implementations of a log structured file system are well-known, and have been commercially used or have been suggested to be used with hard disk drives (HDDs) including multi-platter disks, solid state drives (SSDs) including Flash drives, etc. Some embodiments of the present invention, utilize some of the principles of generic log structured file systems and apply further logic to enable padding of an original destage stream with protected data. The padding of the destage stream with protected data enables the writing of a single successive write sequence over a successive area of the secondary storage entity which includes protected data, without comprising the data set stored thereon. Further details with respect to embodiments of the present invention are provided below.

Figure 2:
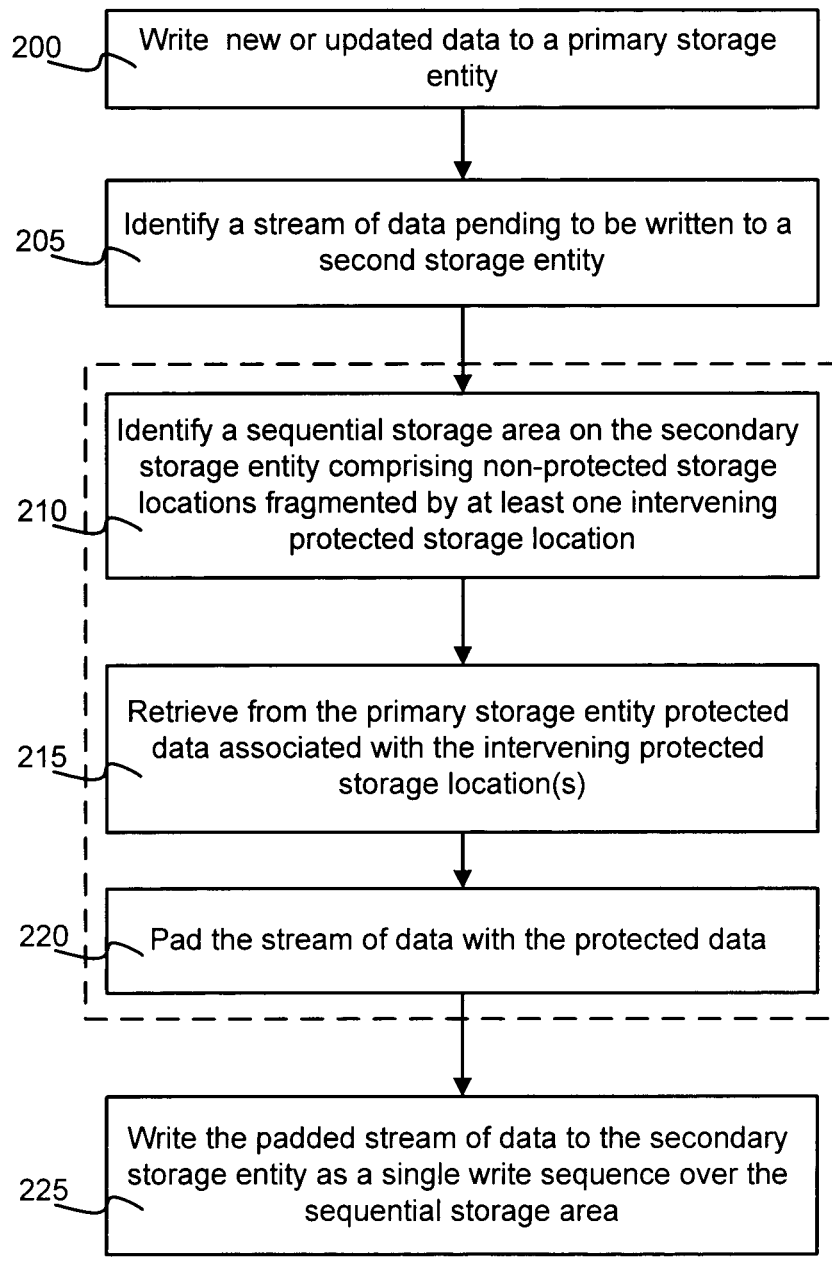
FIG. 2 is a flow chart illustration of a method of managing a multilayered storage system, according to some embodiments of the invention.

Reference is now additionally made to FIG. 2, which is a flow chart illustration of a method of managing a multilayered storage system, according to some embodiments of the invention. According to some embodiments, new or updated data may be written into the primary storage entity 10 (block 200). The secondary storage entity 20 may be used for backing up the data in the primary storage entity 10. A stream of data corresponding to the new and/or updated data may be generated for writing the corresponding backup data to the secondary storage entity 20 (also referred to herein as a "destage stream"). For example, the SSC 30 may include a write buffer 32. The write buffer 32 may be used to aggregate data that is to be written to the secondary storage entity 20, or to the secondary storage space in general. The write buffer 32 allows a sequence of several blocks to be written to the secondary storage entity 20. It would be appreciated that the write buffer 32 may be used for actually storing copies of the destage stream data blocks. Or in further embodiments, the write buffer 32 may be used for storing pointers to data blocks in the primary storage entity 10 which constitute the destage stream. In this implementation, when a certain data block is added to the destage stream, the pointer list is updated and a pointer to the newly added data block is added to the list of pointers in the write buffer 32. Flushing the destage stream to the secondary storage entity may thus involve reading the write buffer 32 to identify the blocks which constitute the destage stream and writing the respective blocks directly from the primary storage entity 10 to the secondary storage entity 20.

Figure 3:
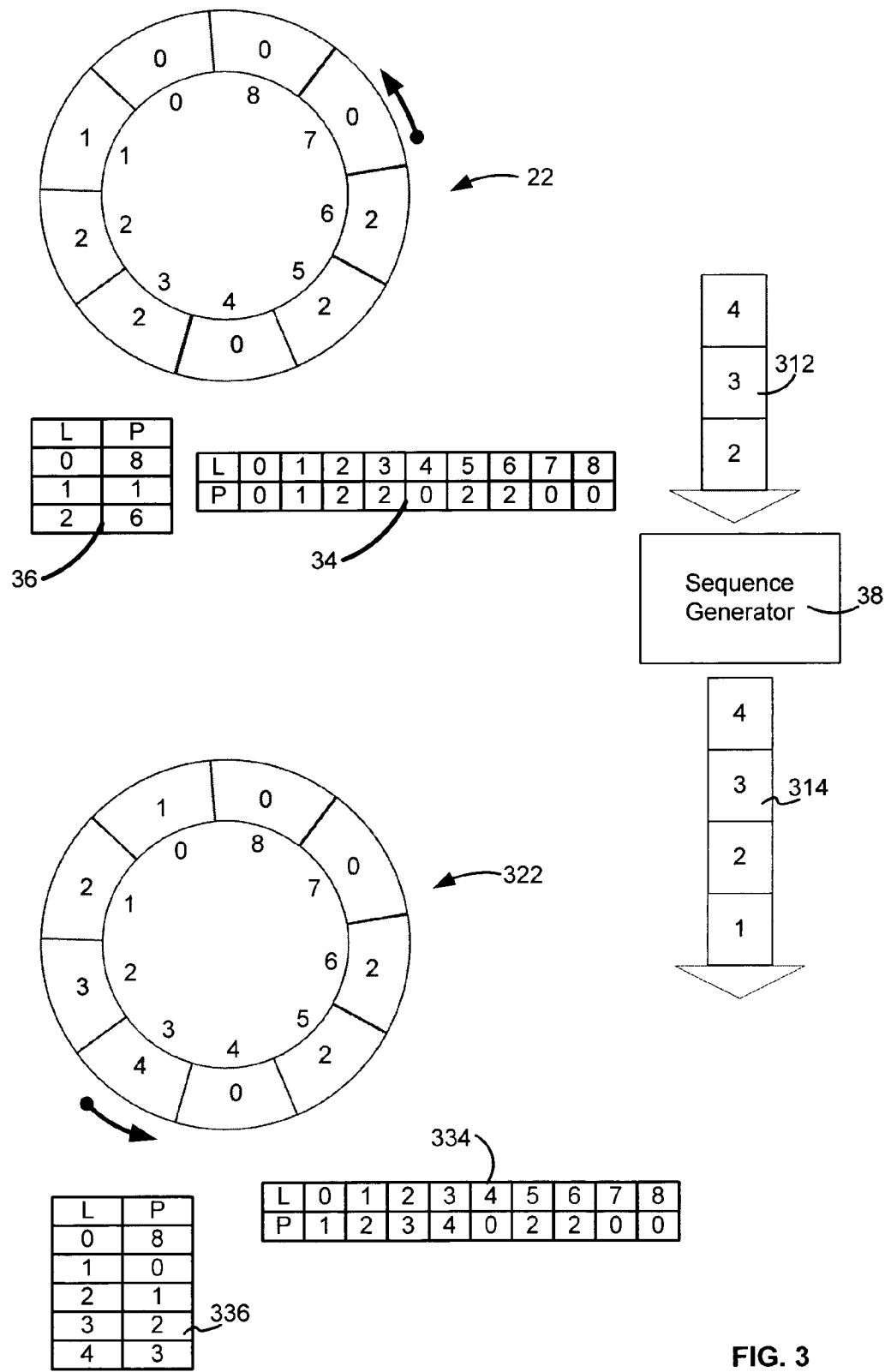
FIG. 3 is a simplified graphical illustration of a process of writing data to a secondary storage entity managed according to some embodiments of the present invention.

Additional reference is now made to FIG. 3, which is a simplified graphical illustration of a process of writing data to a secondary storage entity managed according to some embodiments of the present invention. In FIG. 1 and in FIG. 3 the secondary storage entity, i.e., the disk 20 has a total of nine physical storage locations marked 0-8. In FIG. 1, the SSC 30 includes a mapping module 34 which holds for each physical storage location of the secondary storage entity 20 the logical block currently stored therein. Many data structures may be used for this purpose. For simplicity, each logical block is accommodated by one physical storage location within the secondary storage entity 20. It would be appreciated that in other embodiments, a single logical block may be associated with a plurality of physical storage locations within the secondary storage entity 20, and vice versa. One example of such circumstances may be the case where underlying the secondary storage entity 20 is a RAID group (e.g., RAID 5). In another example, the physical blocks within the primary storage entity 10 are of a different size compared to the blocks of the secondary storage entity 20. For convenience, the current state of the secondary storage entity 20 is also illustrated in FIG. 1 by the sector map 22 shown inside a callout, each sector representing a physical block of the secondary storage entity 20. In FIG. 3 the same state of the secondary storage entity 20 is illustrated by the mapping module 34 and the sector map 22.

The SSC 30 further includes an array 36 which holds for each protected data (referenced by a respective logical address) that is stored within the secondary storage entity 20 the respective physical storage location where that block is stored. The protected data is typically a most-recent version of a logical block that is stored within the storage system 100. Thus, for example, the most recent version of the logical block associated with the logical address '0' is stored within secondary storage entity 20 at the physical storage location referenced '8', and the most recent version of the logical block '1' is stored at the physical storage location referenced '1'.

Continuing with the description of FIG. 2, at some point the SSC 30 may identify a stream of data that is pending to be written into the secondary storage entity 20 (block 205). In FIG. 3, there is illustrated at a first state of the write buffer 32 a provisional destage stream 312 which consists of blocks '2', '3' and '4', block '2' being an updated version of data which was previously stored within the system 100 and blocks '3' and '4' representing new data.

In some embodiments, the SSC 30 may be triggered to initiate a destaging process for writing the destage stream that is pending destage to the secondary storage entity 20 when a certain destaging criterion is met, or alternatively, the SSC 30 may delay destaging of new and/or updated data in the destage stream until the destaging criterion is met. In still further embodiments, the SSC 30 may be configured to select certain block(s) from among all the blocks which are pending to be written into the secondary storage entity 20, and may implement the destaging process with respect to the selected blocks only. The selected blocks would form the destage stream. Further details with respect to some possible destaging criteria and with respect to the selection of the blocks to be destaged at a certain point are disclosed below. Examples of destaging criterion which may be implemented for triggering a destaging process and the criteria which may be implemented for selecting the data that is to be destaged are provided below.

For example, when the destaging of blocks '2', '3' and '4' is triggered, the read/write head 24 of the disk 20 is at sector '8'. Optionally, the current location of the read/write head 24 is made available to the SSC 30 in a manner known per se. According to some embodiments, in response to the triggering of the destaging of blocks '2', '3' and '4' the SSC 30 may search for non-protected physical storage locations within the secondary storage entity 20 which can accommodate the data stream 312 that is pending to be written into the secondary storage entity 20, and in this example, blocks '2', '3' and '4'. In some embodiments, the SSC 30 may search for non-protected physical storage locations ahead of the current or ahead of the last known location of the read/write head 24. In further embodiments, the SSC 30 may search for non-protected physical storage locations ahead of the current location or ahead of the last known location.

As a result of the search for non-protected physical storage locations, the SSC 30 may identify an area on the secondary storage entity 20 which is a succession of physical locations on the secondary storage entity 20 including non-protected physical locations in an extent that is sufficient to accommodate the destage stream and one or more intervening protected physical locations between two or more of the non-protected physical locations (block 210). For example, with reference to the state of the secondary storage entity 20 shown in FIG. 3, the SSC 30 may identify the storage area on the secondary storage entity 20 spanning physical storage locations 0, 1, 2 and '3', which is comprised of non-protected storage locations, namely locations '0', '2' and '3' fragmented by at least one intervening protected storage location, namely location '1'. It would be appreciated that, for convenience, the example that is used herein is highly simplified.

According to some embodiments, the SSC 30 may be responsive to identifying the area on the secondary storage entity 20 for retrieving from the primary storage entity 10 protected data associated with the intervening protected storage location(s) (block 215). Continuing with the reference to the example shown in FIG. 3, the SSC 30 may retrieve from the primary storage entity 10 the data associated with the logical address referenced '1'.

The SSC 30 may be operatively connected to a primary storage controller 40, which is responsible for managing of and interfacing with the primary storage space (or the primary storage entity 10). When the primary storage controller 40 may receive a request from the SSC 30 to provide protected data associated with the intervening protected storage location(s) and may provide the requested data to the SSC 30 or write the requested data directly to the write buffer 32. The SSC 30 and the primary storage controller 40 are shown in FIG. 1, by way of non-limiting example, as being part of a storage system controller 120, which is the component of the storage system 100 that is responsible for managing the storage system 100 and any of its components.

The SSC 30 may use the protected data that was obtained from the primary storage entity 10 to pad the destage stream (block 220), and the SSC 30 may write the padded destage stream 314 to the secondary storage entity 20 as a single write sequence (block 225). The write sequence 314 shall be written over the succession of physical location underlying the identified area. In this regard it would be appreciated that the padding operation may not significantly add latency to the destage process due to the performance characteristics of the primary storage entity 10. Furthermore, in some embodiments, the padding operation may be implemented in advance, prior to the actual destaging, and the protected data may be prefetched into the write buffer 32 in advance. Look ahead operations with respect to the storage space of the secondary storage entity 20 may be used as part of the process of padding with prefetched protected data. Further details with respect to the use of look ahead operation in conjunction with some embodiments of the present invention are described below.

It would also be appreciated, that the primary storage entity 10 may provide good performance in particular for random access ("RA") operations, and may thus allow a relatively fast retrieval of the protected data therefrom. Since the write buffer 32 may also be implemented using high performance data retention unit(s), such as DRAM for example, the entire padding process may be relatively short.

In FIG. 3 the padded stream 314 of data includes block '1' in addition to 'new' or updated data in the original destage stream 312, namely (logical) blocks '2', '3' and '4'. The padded destage stream is written over the physical locations referenced '0', '1', '2' and '3'. The SSC 30 may update the mapping module 34, the sector map 22 and the array 36 to reflect these operations. In FIG. 3, the updates are depicted by mapping module 334, sector map 322, and array 336.

In some embodiments, the SSC 30 may reposition the protected data on the secondary storage entity 20, and may not necessarily write the protected data to the physical location where it was stored before the destage stream was written to the secondary storage entity 20. For example, the SSC 30 may be configured to position the protected data at the head of the padded destage stream, so that it is written first to the secondary storage area 20. In accordance with this example, with reference to the destage process shown in FIG. 3, the destage sequence may be '1', '2', '3' and '4' as is illustrated by mapping module 334, sector map 322, and array 336. However, in further embodiments of the invention, the SSC 30 may otherwise configured to organize the destage sequence, and may, for example, arrange the destage sequence so that the protected data is written to the same position where it was stored before being rewritten as part of the destage sequence, and thus remains at the same location on the secondary storage entity 20. In yet a further embodiments, the SSC 30 may be configured to implement a partial defragmentation procedure as part of determining the destage sequence. The partial defragmentation procedure may be intended to reduce fragmentation on the secondary storage entity 20.

It would also be appreciated that in some cases, the SSC 30 may identify a storage area ahead of a current location or ahead of the last known location of the read/write head 24 which consists of a sequence of non-protected physical storage locations, uninterrupted by an intervening protected storage location, and this uninterrupted sequence may be large enough to accommodate the storage of the stream of data that is pending to be written into the secondary storage entity 20. In this case the SSC 30 may use this uninterrupted storage area and overwrite it with the stream of data. The process which involves the identification of a sequential storage area consisting of an uninterrupted sequence of non-protected physical storage locations and the implementation of blocks 210-220 may be skipped or otherwise disabled for that destage operation or sequence.

It would be also appreciated, that the SSC 30 may choose to split a stream of data that is to be destage to the secondary storage entity 20 and each of the two (or more) parts of the original stream of data may be destaged separately. The invention described herein may be applied to each part of the original destage stream, or it may be applied to only some or even to only one of the parts of the original destage stream. As mentioned above, in some cases, the process according to the present invention may be skipped for some destage streams and under certain circumstances.

Figure 4:
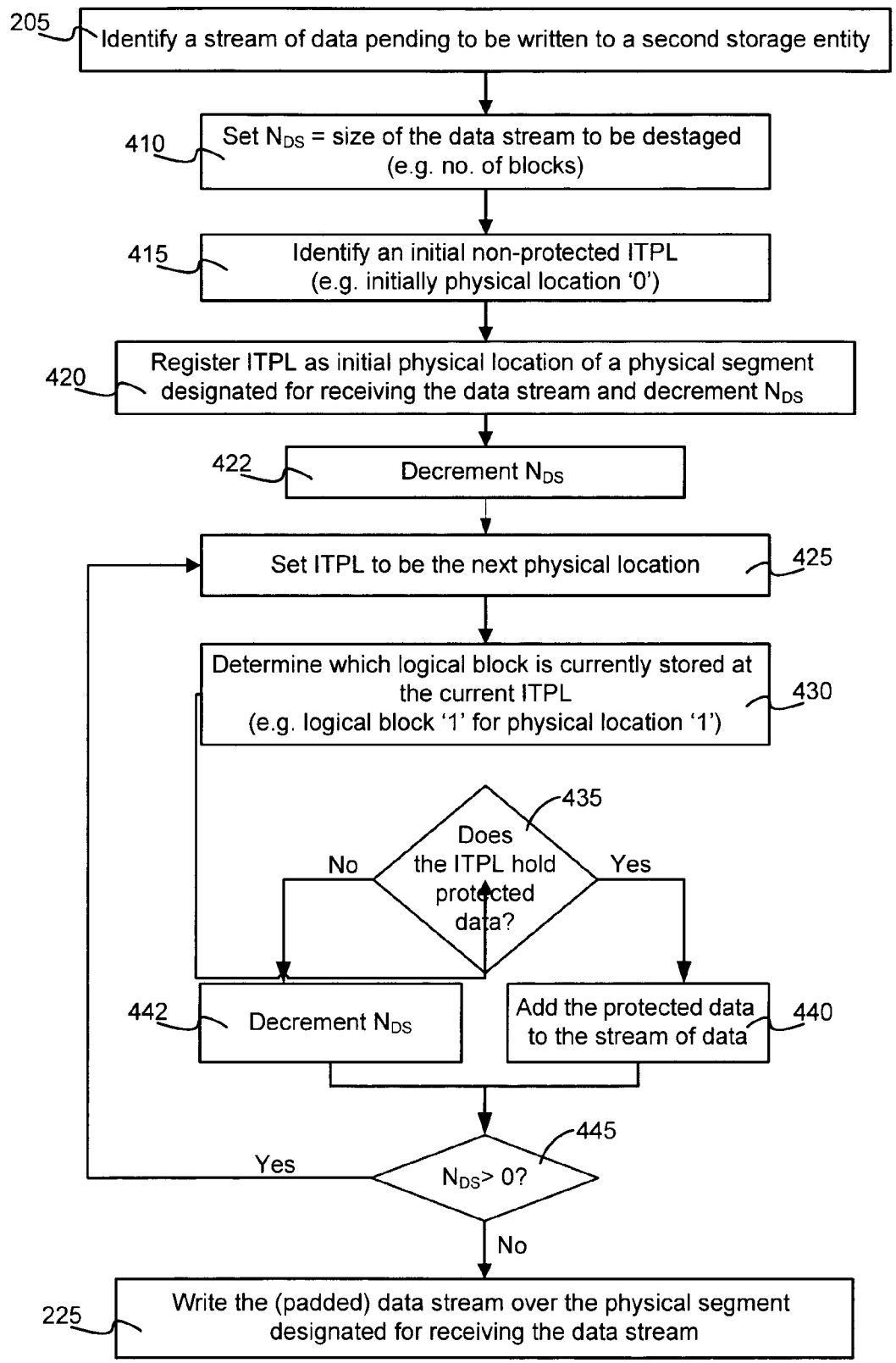
FIG. 4 is an example of one possible process which may be implemented for identifying the sequential storage area on a secondary storage entity, retrieving protected data from a primary storage entity and padding the stream of data to be destaged with the protected data.

FIG. 4, which shall now be described, is an example of one possible process which may be implemented for identifying the sequential storage area on the secondary storage entity 20 (block 210), retrieving the protected data from the primary storage entity 10 (block 215) and padding the stream of data to be destaged with the protected data (block 225). The process may follow block 205, namely identifying a stream of data that is pending to be written into the secondary storage entity 20. Initially, the SSC 30 may set a destage counter $N_{DS}$ according to the size of the stream of data that is to be written into the secondary storage entity 20 (block 410). In the example illustrated by FIG. 4, the destage counter $N_{DS}$ is set according to the number of logical blocks in the data stream.

Next, the SSC 30 may proceed to identify an initial non-protected intended target physical location ("ITPL") (block 415). This operation may involve obtaining the current location of the read/write head 24, and determining the current or the next (or some subsequent) physical storage location which is the ITPL. Once the ITPL is known, the SSC 30 may consult the mapping 34 and the array 36 to identify the data that is stored on the ITPL and to establish whether this data is protected or not. If the data is protected, the current ITPL cannot be used for storing 'new' data, and the SSC 30 may proceed to the next physical storage location on the block device 20.

For example, referring back to FIG. 3, when the destage sequence for blocks '2', '3' and '4' is triggered the SSC 30 the read/write head 24 is passing the sector '7', and sector '8' is its next location. The SSC 30 looks up sector '8' in the mapping module 34 to discover that in this sector a version of a logical block referenced '0' is stored. The SSC 30 looks up logical block '0' within the protected data array 36 and finds that the data in sector '8' is protected. Accordingly the SSC 30 moves to the subsequent sector, which due to the cyclic movement of the disk 20 in FIG. 3, is the block referenced '0'. Block '0' hold a version of the logical block referenced '0'. The SSC 30 may look up logical block '0' within the protected data array 36 and finds that the data in sector '0' is not-protected (the protected version of logical block '0' is stored at the physical storage location referenced '8'). Accordingly, the SSC 30 may identify track '0' as the initial non-protected ITPL.

It would be appreciated that the process of analyzing the storage space of the secondary storage entity 20 may extend over a certain period of time, during which the read/write head 24 may move over several physical storage locations. Accordingly, in some embodiments, the SSC 30 may be configured to skip ahead of a current physical storage location or ahead of the last known location when searching for the area where the data stream is to be stored within the secondary storage entity, as necessary. According to further embodiments, the SSC 30 may analyze the storage space of the secondary storage entity 20 to determine potential areas for receiving destaged data, for example, by characterizing the density of protected data therein. In such a case, the SSC 30 may (or may not) use the information obtained in advance with respect to the different areas of the storage space of the secondary storage entity 20 and may select an area ahead of the current physical storage location or ahead of the last known location for receiving a destage stream, for example, based on the relative density of the area. In further embodiments, the search is not limited to the forward direction, and the area selected for receiving the destage stream may be in any location on the secondary storage entity and in any direction relative to the current physical storage location.

Returning to the description of FIG. 4, the SSC 30 may register the initial non-protected ITPL as the initial physical location of a physical segment designated for receiving the data stream that is to be destaged to the secondary storage entity 20 (block 420), the destage counter $N_{DS}$ is decremented (block 422) to indicate that one of the logical blocks was allocated physical storage resource on the secondary storage entity, and the SSC 30 sets the ITPL to be the next physical storage location of the secondary storage entity 20 (block 425). The previously 'next' physical storage location now becomes the 'current' ITPL. With reference to FIG. 3, following the registration of physical block '0' as the initial physical location of the physical segment, the SSC sets the ITPL to physical block '1'. As will be described below, in further embodiments of the invention, the identification of the segment within the secondary storage entity 20 where the stream of data is to be stored may involve further processing and is not necessarily the segment starting at the first ITPL where non-protected data is stored.

Once the SSC 30 moves to the ITPL to the next physical storage location, the SSC 30 may consult the mapping table 34 to determine which logical block is currently stored at the current ITPL (block 430). In FIG. 3, in physical block '1' a version of the logical block referenced '1' is currently stored. The SSC 30 would then check whether the current ITPL holds protected data or not (block 435). For the secondary storage entity 20 at state 22, physical location '1' holds the most recent (and the only) version of logical block '1', and therefore, for the ITPL '1' the answer at block 435 would be that the current ITPL holds protected data.

In case it is determined at block 435 that the current ITPL holds protected data, the SSC 30 would add the protected data to the stream of data that is to be written to the secondary storage entity 20 (block 440). Referring back to FIG. 3, the SSC 30, for example using a dedicated sequence generator 38, may pad the original stream of data 312 consisting of blocks '2', '3' and '4' with protected data, namely, logical block '1', giving rise to the padded stream of data 314. Padding of the original stream of data 312 may involve retrieving the protected data from the primary storage entity 10, in a manner known per se, and writing it to the write buffer 32, together with the blocks in the original stream of data to be destaged.

From block 440 the process moves to block 445, where the SSC 30 determines whether the current destage counter $N_{DS}$ is larger than zero, indicating that there is data in the stream of data to be destaged that has not yet been allocated a physical location on the secondary storage entity 20. For example with reference to FIG. 3, after the padding of the stream of data to be destaged with logical block '1', the SSC 30 checks the destage counter $N_{DS}$. At this stage the counter would read '2', since thus far, a physical storage location was allocated for only one of the 'new' blocks (namely, sector '0'), and sector '1' was allocated for protected data.

In case the destage counter $N_{DS}$ at block 445 is larger than zero, the process returns to block 425, where the ITPL is set to the next physical location. In the example of FIG. 3 following the padding of the stream of data to be destaged with logical block '1', the ITPL is set to the physical location reference '2'. At blocks 430 it is determined which logical block is currently stored at the current ITPL, and in FIG. 3 this would be logical block '2'. At block 435 it is determined whether the current ITPL holds the protected version of the logical block that is stored therein, which in the current example, the answer would be no, since the protected version of logical block '2' is stored at the physical location referenced '6'. Accordingly the SCC 30 decrements $N_{DS}$ (block 442), indicating that a physical storage location was allocated for another one of the 'new' blocks.

Blocks 425-445 are repeated until at block 445 the destage counter $N_{DS}$ is no longer larger than zero. When the destage counter $N_{DS}$ is no longer larger than zero, indicating that all the data in the stream of data to be destaged was allocated physical resource on the secondary storage entity, the SSC 30 may write the padded data stream over the physical segment designated for receiving the data stream (block 225). It would be appreciated that the segment that is used for receiving the data stream need not be explicitly allocated, and that in some embodiments, providing the initial physical location which is the starting point for writing the sequence of destaged data is sufficient.

It would be appreciated that the write buffer 32 may have limited capacity and the destage operation may be constrained by the buffer's 32 capacity. Under certain circumstances, the extent of dirty data may exceed the capacity of the write buffer 32. In such cases, and according to certain embodiments, two or more destage streams may be created, the size of each of the derived destage streams being limited to the size of the write buffer 32.

Furthermore, the padding operation may add additional data to the destage stream, and while the size original destage stream may be less than the size of the write buffer 32, the size of the padded destage stream may be exceed the size of the write buffer 32. In some embodiments, in such a case, the SSC 30 may be adapted to split the padded destage stream. After destaging the first part of the destage stream, the SSC 30 may proceed to destage the second part of the destage stream and so forth (in case of more than two parts). However, it is also possible, that following the destaging of each part of a padded destage stream that was formed by splitting a larger padded destage stream, the process of determining a subsequent destage stream and padding it, if necessary, will be carried out from the top, and the SSC 30 would not revert to remaining portion of the padded destage stream. In further embodiments, the SSC 30 may implement look-ahead techniques to evaluate, in advance, a size of a destage stream consisting of dirty data blocks together with the corresponding protected data blocks which are required for padding the dirty data blocks, and the SSC 30 may apply to this process a size constraint based on the capacity of the write buffer 32, so that the resulting destage stream is not larger than the capacity of the write buffer 32.

It would be appreciated that FIG. 4 and the accompanying description provides only one example of the manner by which the process of identifying the sequential storage area on the secondary storage entity 20 (block 210), retrieving the protected data from the primary storage entity 10 (block 215) and padding the stream of data to be destaged with the protected (block 225) may be implemented by a storage system according to some embodiments of the present invention.

In further embodiments, the selection of the area within the secondary storage entity 20 where the stream of data pending destage is to be written, is not limited, such that the area begins with the first physical location where non-protected data is stored. By way of example, the SSC 30 may utilize look-ahead and other mechanisms to select the most appropriate area within the secondary storage entity 20 for receiving the destaged stream of data. In still further embodiments, the SSC 30 may be configured with different criteria for determining which is the most appropriate area within the secondary storage entity 20 for receiving the destaged stream of data.

For example, the SSC 30 may be configured to choose among two or more candidate areas, each area including a sufficient amount of non-protected physical storage locations to accommodate the 'new' data in the destage stream, the area in which the non-protected data is more dense relative to the other candidate areas. In this regard, it would be appreciated, that areas that are characterized by low density of non-protected data and high density of protected data may require extensive fetching and padding activity and may also lead to the padded stream of data exceeding the size of the write buffer 32.

In another example, the SSC 30 may be configured to choose an area for receiving the destage stream that is characterized by a sufficient amount of non-protected physical storage locations to accommodate the 'new' data in the destage stream and the least amount of protected data.

In yet a further example, the SSC 30 may be configured to choose the closest area within the secondary storage entity 20 relative to the current position of the read/write head 24 (and possibly taking into account the direction of movement of the read/write head 24 over the physical storage medium) which includes a sufficient amount of non-protected physical storage locations to accommodate the 'new' data in the destage stream and wherein the amount of physical storage locations holding protected data is less than a certain threshold.

In still a further example, the SSC 30 may be configured to choose among two or more candidate areas, each area including a sufficient amount of non-protected physical storage locations to accommodate the 'new' data in the destage stream, the area which provides the best relation between seek and padding operations. Seek is the operation which brings the read/write head 24 to the start of the respective area. The padding operation adds protected data that is stored within the respective to the destage stream to allow the writing of the destage stream to the secondary storage entity 20 as a unified sequential stream without damaging the integrity of the protected data stored within the secondary storage entity 20.

An example of a process of locating an area of successive physical blocks on a secondary storage entity 20 which includes non-protected storage locations in an extent that is sufficient to accommodate 'new' data that is pending to be destaged, and which is fragmented by at least one intervening protected storage location is graphically illustrated in FIG. 5. In FIG. 5, the initial state of the disk is depicted by mapping module 534, sector map 522, and array 536.

In FIG. 5 the destage process is triggered and the stream of data 512 to be destaged to the secondary storage entity 20 (or the disk as it is referred to in this example) consists of the logical blocks reference '6' and '7'. When the destage process is triggered, read/write head 24 is passing sector '6', and sector '7' is the next location of the read/write head 24. If the process that was described above with reference to FIG. 4 was implemented by the SSC 30, given the state 522 of the disk 20, it would have been determined that the initial ITPL, namely storage location '7' holds non-protected data, in this case a non-protected version of the logical block '1', and so the area on the disk 20 that would be used for receiving the destage sequence will start from storage location '7'. Subsequent blocks '8', '0', and '1' all hold protected data, and since two non-protected physical locations are required to accommodate the storage of the two logical blocks in the destage stream 512, block '2' which holds non-protected is also added to the area that is to be used for receiving the padded destage stream. Accordingly the process illustrated by FIG. 4 would suggest forming a padded destage sequence 513 which consists of logical blocks '6' and '7' from the original destage stream 512 padded with the current version of logical blocks '0', '2' and '3'. The SSC 30 would then write the padded destage stream 513 over the physical area consisting of the physical locations referenced '7', '8', '0', '1' and '2'. As mentioned above, the SSC 30 may be configured to order the blocks within the padded destage stream in different arrangements. This operation would restore the protected data and would write the 'new' data onto the disk 20 via a single sequential write operation. Indeed according to some embodiments, this the process that would be implemented by the SSC 30 and may eliminate non-sequential writing to the disk 20. However, in accordance with further embodiments of the invention, the SSC 30 may be adapted to implement, at least under certain scenarios, an alternative process, as is shown by way of example in FIG. 5.

In FIG. 5, and according to some embodiments of the present invention, the SSC 30 may be configured to look ahead beyond the closest area that was identified as being appropriate for receiving the destage stream, and may identify one or more alternative areas for receiving the data that is to be destaged to the disk 20. An alternative area is a succession of physical locations on the secondary storage entity 20 that is formed by non-protected physical locations in an extent that is sufficient to accommodate the destage stream and one or more intervening protected physical locations between two or more of the non-protected physical locations, whose initial ITPL is located further away relative to the closest area that was identified as being appropriate for receiving a padded destage stream (based on the current position and movement direction of the read/write head 24). For example, as is shown in FIG. 5, the SSC 30 may identify an alternative area on the disk 30, consisting of the successive physical locations referenced '2', '3' and '4' which can be used for accommodating a padded destage stream 514 which consists of three logical blocks, namely protected block '4' and 'new' blocks '6' and '7' from the original destage stream 512. Mapping module 535 and array 537 complete the illustration of the state of the secondary storage entity 20 following the destaging of the padded destage stream 514. It would be appreciated that the padded destage stream 514 is more compact than the alternative padded destage stream 513 generated in accordance with the process illustrated in FIG. 4 and described above. In FIG. 5 an X sign is placed over the alternative padded destage stream 513 and its corresponding sector map 523, to indicate that this alternative was not selected.

It would be appreciated that a more compact destage stream may involve a further seek on the disk 20, but may (or may not), provide a better utilization of the system's 100 resources. The look ahead operation may be constrained, for example, such that the SSC 30 is configured to look ahead only up to a certain point ahead of the current location or the last known location. By way of example, the SSC 30 may be limited in terms of the number of physical locations (sectors) ahead of the current location or ahead of the last known location of the read/write head 24 that the SSC 30 is allowed to process as an ITPL. Further non-limiting examples of specific look ahead configurations that may be implemented by the SSC 30 for identifying alternative areas include the following:

Scan the entire storage space of the secondary storage entity 20 for a succession of physical locations formed by non-protected physical locations in an extent that is sufficient to accommodate the destage stream and one or more intervening protected physical locations between two or more of the non-protected physical locations. The scanning operation may be carried in chunks as was mentioned above.

Scan a predefined portion of the secondary storage entity 20 for a succession of physical locations formed by non-protected physical locations in an extent that is sufficient to accommodate the destage stream and one or more intervening protected physical locations between two or more of the non-protected physical locations.

Scan the secondary storage entity 20 for areas formed by a succession of physical locations formed by non-protected physical locations in an extent that is sufficient to accommodate the destage stream and one or more intervening protected physical locations between two or more of the non-protected physical locations, but stop once a certain predefined number of alternative areas are identified.

In case more than one area has been identified as being appropriate for receiving the destage stream (possible after it has been padded), the SSC 30 may utilize a selection criterion for selecting the area that is to be used. Non-limiting examples of a possible selection criterion may include the following: choose the closest area within the secondary storage entity 20 relative to the current position of the read/write head 24 or relative to the last known position of the read/write head 24; choose the area in which the non-protected data is more dense relative to the other candidate areas; choose the area which provides the best relation between seek and padding operations.

It would be appreciated that the criteria for identifying alternative areas may be implemented together with other search criteria, including for example, criteria for searching for uninterrupted fully successive sequences of non-protected physical storage locations, and that the SSC 30 may be configured to select the preferred area among all identified areas, whether interrupted by intervening protected blocks or not.

Having described embodiments of the invention related to the identification of alternative candidate areas on the secondary storage entity from amongst which the area to receive the destage stream may be selected, there is now provided a description of embodiments of the invention applied to a storage system wherein the secondary storage entity is part of a RAID group. Reference is made to FIG. 6 which is a c As mentioned above, the secondary storage entity which is the target of a certain destage stream may be part of a secondary storage layer, together with other secondary storage entities, possibly serving the same function as the subject secondary storage entity. In some embodiments, two or more of the secondary storage entities may be part of a common RAID group.

FIG. 6 depicts an implementation of certain aspects of the present invention with respect to two secondary storage entities which are part of the same RAID group. The sector map 622 represents the state of a first disk and the sector map represents the state of a second disk 623 when the destaging of a new destage stream 612 is initiated. For simplicity, a straightforward striping configuration is implemented over the RAID group which the first and the second disks are part of, and in this case the RAID group is comprised of only the first and the second disks, so that even logical addresses (or logical blocks) are assigned to the first disk represented by sector map 622 and odd logical addresses are assigned to the second disk represented by sector map 623.

In this example, the destage stream 612 whose destaging was triggered consists of logical block '5', '6', '7' and '10'. The destage stream 612 is receiving at a RAID controller 639 which assigns the different logical blocks to the respective disks according to the RAID map or RAID function. In FIG. 6, since the first disk is associated with the even logical addresses, logical blocks '6' and '10' are assigned to the first disk, and since the second disk is associated with the odd logical addresses, blocks '5' and '7' are assigned to the second disk.

The split provisional destage streams 613 and 614 are fed to the sequence generator 638. The storage area of each of the disks is processed and if it is determined that an area where a destage stream 613 or 614 is to be stored on the first or on the second disk requires padding of the provisional destage stream 613 or 614, the sequence generator 638 pads the destage stream 613 or 614 as necessary.

For example, in FIG. 6, when the destage operation is executed for the first disk the read/write head of the disk is passing sector '3' and the next sector is '4'. In sector '4' there is currently stored un-protected data, and together with sector '6', which is also currently used for storing un-protected data and intervening sector '5' which is currently used to store the protected version of logical block '6' an area of successive blocks is formed onto which a padded version of the destage stream 615 can be written. The padded destage stream 615 is padded with the protected data, namely the protected version of logical block '6', and so the destage sequence can be written to the disk using a single sequential write operation, without compromising the protection of logical block '6'.

In a similar manner, a padded stream 616 (logical blocks '1', '5', and '7') is formed for writing onto an area of the second disk the destage stream 614 associated with the second disk padded with the protected version of logical block '1' to enable the sequential writing of the padded stream 616 over an area that is formed by a succession of physical locations including non-protected physical locations in an extent that is sufficient to accommodate the destage stream (locations '6' and '8') and one or more intervening protected physical locations (location '7') between two or more of the non-protected physical locations.

In FIG. 6 and in the description thereof hereinabove, some features of the present invention are applied independently to each member of the RAID group, and the padded destage streams are created specifically for each member of the RAID group (in this case each member is a disk). In the case where teachings of the present invention are applied to each member of the RAID group, each such member is regarded as a secondary storage entity 20 by its own. However, in further embodiments, the RAID group may be presented as a virtual storage entity (e.g. a virtual disk), and the state of each individual storage unit that is a member of the RAID group may not be visible to the SSC 30 (or the SSC may simply choose not to use it). In this case, the entire RAID group is regarded as a single secondary storage entity 20, and the storage block addresses' provisioned by the controller of the RAID group (also commonly referred to as a "RAID controller") are regarded by the SSC 30 as physical storage locations. Under these circumstances, the SSC 30 may be adapted to generate the padded destage stream based on the addressing scheme provisioned for the virtual storage entity, and the RAID controller would generate the write streams for each member of the RAID group from the destage stream that was addressed to the group as a whole.

It would be appreciated, that in case of large writes, at least for some RAID implementations, each member of the RAID group would benefit from a successive padded sequence, that is generated based on the virtual map, as would be apparent to those versed in the art.

Some RAID types store in addition to the data-set recovery enabling data, usually in the form of parity bits associated with a subset of the data-set which the recovery enabling data is intended to protect. In some cases, a parity unit may also be associated with and protect one or more bits of other parity units (as in RAID 6, for example). Parity data may be located between two protected data blocks, between a protected block and a non-protected data block and between two non-protected data blocks. Therefore, in order to allow sequential writing to a storage unit that is a member of a parity RAID group, parity data that is stored on the storage unit in-between data blocks which are part of a padded destage stream (including protected and non-protected) need to be added to the destage stream. Accordingly, regardless of whether the SSC 30 refers to each member of a parity RAID group or to the group as a whole, in order to permit sequential writing to the storage unit or units which are members of a parity RAID group, the intervening parity data needs to be added to the padded destage stream.

In some embodiments, in case the SSC 30 refers to each member of a parity RAID group as a secondary storage entity 20, i.e, the SSC 30 relates to the actual physical storage mapping each member of the RAID group, and "sees through" the virtual mapping provided by the corresponding RAID controller, the SSC 30 may identify the intervening locations where parity data is stored within the parity RAID group member and may add the parity data to the padded destage stream. According to some embodiments, in case the primary storage entity 10 does not hold the parity data, the SSC 30 may calculate, on-the-fly, the parity data based on the data stored in the primary storage entity 10 and may add the calculated parity data to the padded destage stream, at the appropriate location according to the RAID mapping over the secondary storage entity 20. It would be appreciated that in parity RAID groups the location of parity data on each member of a RAID groups is significant and therefore the SSC 30 would be configured to preserve the order of the data blocks on the secondary storage entity 20 dictated by the RAID scheme. In case the destaging of a current destage stream effects the data on one or more of the other members of the parity RAID group, the SSC 30 may create or adapt complimentary tasks to apply the corresponding changes to the effected members of the parity RAID group. In further embodiments, the SSC 30 is at least partially aware of the RAID scheme and accordingly extend a (padded) destage stream to include complete parity groups.

In further embodiments, in case the mapping scheme of the parity RAID group is transparent to the SSC 30, and the entire group is "seen" by the SSC 30 as a single (virtual) disk, the SSC 30 may be unaware of the parity data. Thus, the padded destage stream provided by the SSC 30 to the controller of the parity RAID group does not include the intervening parity units. In such cases, and according to some embodiments, the controller of the parity RAID group may calculate the intervening parity units and may generate successive destage substreams for each member of the parity RAID group, in a manner known per se. It would be appreciated that in some cases a parity unit that is associated with a certain new or modified data block may be outside the area associated with the padded destage stream. As part of some embodiments of the invention, the RAID controller may also add such non-intervening effected parity units to a subset destage stream to affect that change with respect to a member or members of a parity group on the respective parity unit. In another embodiments, the RAID controller may extend a (padded) destage stream to include complete parity groups.

In a further example, some embodiments of the present invention may be applied to the multi-layered storage system disclosed in co-pending U.S. Provisional Application Ser. No. 61/193,079 and in the corresponding PCT application No. IL2009/001005 filed Oct. 27, 2009 assigned to a common assignee, both of which are incorporated by reference in their entirety into the present disclosure. The storage system disclosed in U.S. Provisional Application Ser. No. 61/193,079 and in the corresponding PCT application No. IL2009/001005 filed Oct. 27, 2009 includes a primary storage space, a temporary backup storage space, a permanent backup storage space, a storage controller and one or more uninterrupted power supply ("UPS") units.

The primary storage ("PS") space is associated with a plurality of volatile storage ("VS") devices and is used for persistently storing the entire data-set of the storage system. The temporary backup storage ("TBS") space is also associated with a plurality of VS devices. The permanent backup storage ("PBS") space is associated with nonvolatile storage ("NVS") devices.

The controller is responsive to a write request related to a data element being received at the storage system for implementing a provisional redundant storage sequence including: storing the data element within the PS space and substantially immediately or concurrently storing recovery-enabling-data corresponding to the data-element within the TBS space. The controller is configured to acknowledge the write request substantially immediately following completion of the storage within the PS space and within the TBS space, and the provisional redundant storage sequence is thus complete. The one or more UPS units are configured to provide backup power to extend data-retention on some or all of the VS devices in case of power interruption. Asynchronously with the provisional redundant storage sequence, the controller is configured to destage the recovery-enabling-data to the PBS space.

It would be appreciated by those versed in the art that the PS space can be regarded as being analogous to the primary storage layer and the PBS space can be regarded as being analogous to the secondary storage space that were mentioned above. It would be appreciated that in case the PS space is based on VS devices, and the PBS is associated with NVS devices, such as HDDs, the PS space would be characterized by relatively high performance in particular in RA, whereas the PBS provides relatively low performance and prefers sequential writes over non-sequential access. Those of ordinary skill in the art would appreciate that the general characteristics of VS versus HDD storage applies to other types of storage relative to each other, and that the present invention may be applied to any combination of different types of storage which exhibit similar relative performance.

It would be further appreciated by those versed in the art, that for the purpose of understanding various aspects of the present invention, the function of the temporary backup storage space is not significant, since some embodiments of the present invention do not require the use of such a temporary backup storage layer. However, as part of other embodiments of the present invention, a temporary backup storage layer may be used to obtain improved availability when using VS in the primary storage without compromising performance. In such embodiments, the destage stream may be generated based on dirty data within the TBS space. When it is time to destage certain blocks, the blocks to be destaged to the PBS space may be fetched from the TBS space. In case the SSC decides to pad the original destage stream with protected data, as was described in detail above, the protected data may be obtained from the PS space. Thus, the padded destage stream may be generated by fetching data both from the TBS and from the PS space to form a combined sequence within the write buffer. It would be appreciated that the entire process of generating the padded destage sequence may be relatively fast thanks to the high performance capabilities of the underlying storage units, in particular in RA. It would be appreciated that other configurations may be used for generating the padded destage stream, including fetch data from only the PS space, and in such a case both the protected and the non-protected data within the padded destage stream are obtained from the PS space. It would be appreciated that in some embodiments, the data within the PBS is not (or is not limited to) an actual copy of the data in the PS, rather some recovery enabling data is stored which enables to recover the data set in the PS. Embodiments of the invention which relate to the transformation of the data in the PS to corresponding recovery enabling data, such as parity data, were described above.

Continuing with the description of the storage system proposed in U.S. Provisional Application Ser. No. 61/193,079 and in the corresponding PCT application No. IL2009/001005 filed Oct. 27, 2009, the controller may be configured to manage the asynchronous destaging of the recovery enabling data in accordance with a predefined permanent backup deferral policy which takes into account at least one parameter that is independent of the provisional redundant storage sequence of the respective data element. The deferral policy may provide a controlled timeframe for deferring the asynchronous destaging of the recovery enabling data relative to the storage system's response to the respective write request (the storage system response may be any one of the operations which are part of the provisional redundant storage sequence). The deferral policy may take into account the capacity of the UPS units. The deferral policy may further take into account the availability of storage resource within the TBS space. The deferral policy may take into account at least one other process running within the storage system and competing for resources with the data destaging process.

During normal operation (not power interruption) the UPS units are configured to provide backup power for at least the time-duration required for completing the destaging of data from the TBS space (which is based on VS devices) to the PBS space (which is based on NVS devices), so that the entire data-set of the storage system is backed up on NVS devices before the storage system can gracefully shutdown. In case the TBS is not implemented, the UPS units are configured to provide backup power for at least the time-duration required for completing the destaging of dirty-data from the PS space (i.e., data which has not yet been backed up within the PBS space) to the PBS space.

Further as part of the storage system proposed in U.S. Provisional Application Ser. No. 61/193,079 and in the corresponding PCT application No. IL2009/001005 filed Oct. 27, 2009, the controller may be responsive to an indication that the recovery-enabling-data was successfully destaged to the PBS space for releasing the TBS space resources that were used for storing the corresponding recovery-enabling-data. Once released, the storage resources of the TBS space can be used for storing other data, such as recovery-enabling-data corresponding to a data element that is associated with a more recent write command.

The storage capacity of the TBS space is substantially smaller than the storage capacity of the PS space. The storage capacity of the PBS space is substantially equal to (or larger than) the storage capacity of the PS space. At any time during the operation of the storage system, the data stored within the PS space is protected by corresponding recovery-enabling-data that is stored within the TBS space or within the PS space. During normal operation (not power interruption), a relatively small portion of the data within the PS space is protected by data within the TBS space, and the PBS space protects at least the remaining data which is not protected by the data within the TBS space.

As is well known, and as was mentioned above, the ability of a volatile data-retention unit to retain data is sensitive to main power interruption. It is therefore common to regard volatile data retention devices as "memory devices" and not as "storage devices". However, it would be apparent to those versed in the art that within the storage system proposed in U.S. Provisional Application Ser. No. 61/193,079 and in the corresponding PCT application No. IL2009/001005 filed Oct. 27, 2009, and described above, utilizes the primary storage space which is associated with volatile data-retention devices (or "volatile storage devices") in combination with other components and logic for substantially persistently storing data therein. Specifically, the proposed storage system further includes: two complementary backup storage spaces: a temporary backup storage layer (or space) which is also associated with VS devices; and a permanent backup storage layer which is associated with NVS devices, a storage controller and one or more UPS units for providing backup power to enable full backup in case of power interruption and graceful shut-down, and a recovery controller for recovering the data into the primary storage space following data loss within the primary storage space.

The VS devices associated with the PS space are regarded herein as storage devices, despite their inherent volatility, since the logical storage addresses that are used by the storage system for servicing I/O requests from external sources are associated with physical storage locations on VS devices, and this configuration is restored in case of power interruption before normal operation of the storage system is resumed. It would be appreciated that this sort of behavior is characteristic of storage devices.

During normal operation of the storage system, I/O requests from external sources (which typically reference logical storage addresses) are mapped to physical storage locations allocated for the PS space by the VS devices associated with the PS space. In case of failure within the PS space, the entire data-set is protected, as explained above, and can be recovered from the PBS layer or from the TBS layer. In case of severe power interruption, the entire data-set of the storage system is stored within the NVS devices underlying the PBS layer, and once normal power is restored the data that was lost is recovered into the PS space and normal I/O operations are resumed vis-à-vis the VS devices associated with the PS space.

From a user's (host) perspective, the data protection and the data availability capabilities of the storage system are similar to the protection and availability provided by many commercially available non-volatile storage systems, such as hard-drive disk ("HDD") based storage systems (including various RAID implementations), or in another example, such as non-volatile solid-state disk ("SSD") flash based storage systems. For example, when a read command is received at the storage system proposed in U.S. Provisional Application Ser. No. 61/193,079 and in the corresponding PCT application No. IL2009/001005 filed Oct. 27, 2009, say from a host, the storage system controller reads the logical storage address referenced by the read command and determines the corresponding physical storage location(s) associated with the referenced logical storage address. The physical storage location(s) point towards specific locations within one or more of the first plurality of VS devices associated with the PS space. The storage system controller reads the data stored on the VS device(s) at the physical storage location(s) determined to be associated with the read command and communicates the data back to the host.

A permanent backup deferral policy may be implemented for managing the destaging of data to the PBS space. The permanent backup deferral policy may determine the actual initiation of the destaging of a destage stream, according to predefined deferral criteria. There is now provided, by way of example, a description of certain aspects of a deferral policy which may be implemented within by the storage system. The examples of the deferral policy are described below with reference to the storage system disclosed in U.S. Provisional Application Ser. No. 61/193,079 and in the corresponding PCT application No. IL2009/001005 filed Oct. 27, 2009, but the principles of the deferral policy can be used for managing the triggering of a destaging process within any multi-tier storage system wherein or whereupon the present invention is implemented.

In some embodiments, in accordance with the deferral policy, the writing of data to the PBS space is deferred relative to the writing of the respective new or newly modified data within the PS space. In further embodiments, the deferral of the backup within the PBS space is not synchronous with the storage of the new or newly modified data within the PS. In further embodiments, the permanent backup deferral policy may set forth a controlled timeframe for suspending the writing of data to the PBS space relative to the storage of the corresponding data within the PS space.

In some embodiments, the point of reference that is used by the deferral policy for measuring a deferral interval for any given data may relate to any one of the events related the provisional redundant storage sequence mentioned above. In further embodiments, the deferral policy may take into account at least one parameter that is independent of the provisional redundant storage sequence.

In some embodiments, the deferral policy may be configured to take into account the capacity or the UPS units. The deferral policy may further take into account the availability of storage resource within the TBS space. In another example, the deferral policy may take into account the size of the destage sequence, either before of after padding with protected data. In yet further embodiments, the deferral policy may take into account the age of the updated or new data in the destage stream.

According to some embodiments, the deferral policy may include a priority rule, function and/or criterion for promoting the destaging of a pending destage streams to the PBS space with time. Thus, all other things being equal, a priority of a pending destage stream may increase with time.

In still further embodiments, the deferral policy may take into account at least one other process running within the storage system. For example, in some embodiments, according to the deferral policy, a destage stream may be deferred, for example, to allow completion of a priority operation or a priority sequence that is concurrently pending or that is concurrently taking place within the storage system. According to some embodiments, while the destage stream is pending, its own priority may be adjusted (promoted) and thus it may itself become a high-priority operation relative to other operations within the storage system. It would be appreciated that other measures may be implemented to control the amount of time a certain destage stream or the flushing procedure as a whole is delayed. In further embodiments, a pending destage stream may be deferred for relatively long, and possibly unlimited, time duration.

According to some embodiments, the deferral policy may manage a queue of pending write commands (dirty data blocks) to the permanent backup storage space, and the management of the queue may be associated with the (current) capacity of the UPS units. Various queue management techniques are known per se and may be implemented in some embodiments of the present invention. The deferral policy may control the size of the queue and may manage it according to the capacity of the UPS units, so that in case of power interruption the backup power is sufficient to destage the entire queue of pending write commands to the permanent backup storage space and to store the backup data within the non-volatile media underlying the permanent backup storage space. The size of the pending write requests queue is a parameter related to the aggregated footprint of the pending write requests in terms of storage space and/or in terms of the amount of power required in order to complete the destaging of the pending write requests in the queue and the storage thereof within the permanent backup storage space.

In some embodiments, the deferral policy may include several—progressive thresholds, the progressive thresholds associated with respective progressively increasing queue sizes. In association with each one of the progressive thresholds, the deferral policy may include a priority parameter, so that the larger the size of the queue the higher the priority that is given to pending write requests at the top (or at the bottom—depending on the queue management technique) of the queue. The measure and possibly other measures included in the deferral policy may be used to ensure that the size of the pending write requests queue does not grow beyond that which can be supported by the available backup power. In some embodiments, in case the amount of available backup power changes, the deferral policy is manually or automatically updated accordingly.

In further embodiments, the size of the temporary backup storage space is determined according to the capacity of UPS units, or according to the amount of available backup power. For example, the temporary backup storage space is such that the size of the available backup power is sufficient to enable to complete the destaging of the entire temporary backup storage space (or the full set of dirty data blocks) and to complete storage of data which corresponds to the entire temporary backup storage space within the permanent backup storage space. In such embodiments, the deferral policy may relate to the amount of temporary backup storage space that is used for storing backup data and may promote issuance of write commands to the permanent storage space as temporary backup storage resources are approaching (e.g., to various degrees) depletion. In case the system is implemented without such temporary backup storage space, the deferral policy may relate in a similar manner to the amount of dirty data and to extent of resources within the primary storage entity that are used for storing dirty data.

In some embodiments, according to the deferral policy, within the queue of pending write commands to the permanent backup storage space, priority is given to write commands which are associated with a data element which was least accessed, e.g., priority is given to destaging recovery enabling data which is associated with a data element which has been accessed the smallest number of times during a certain period of time. In another example, according to the deferral policy, priority is given to write commands which are associated with a data element which was least recently access (the oldest data). Access frequency and/or most recent access times may be used by the deferral policy as indication of likelihood that the data element will be accessed again soon. By anticipating (with at least partial success) rewrites on a certain data element and the resulting updates to the corresponding recovery enabling data within the temporary backup storage space, it may be possible to reduce the number of writes to the permanent backup storage space, and to improve utilization of the temporary backup storage space and overall performance of the storage system. These embodiments are of particular relevance when the amount of dirty data is more than can be accommodated by the write buffer that is used for forming the destage stream, or a similar limit imposed by any other resource of the storage system.

In a further example of a possible deferral policy, the deferral policy may take into account services or processes within the storage system or associated with the storage system. In some embodiments, the deferral policy may take into account services or processes which compete for system resource with the destaging process. By way of example, the deferral policy may include a predefined system optimization criterion. The system optimization criterion may relate to at least one resource of the storage system and may prescribe an optimization scheme, an optimization threshold or an optimization function with respect to the system resource(s). According to the deferral policy, and based upon the predefined system optimization criterion, the issuance of a write command to the permanent backup storage space may be deferred for a certain period of time from its initiation or following the system's response the corresponding incoming write command.

In some embodiments, the optimization criterion may relate to one or more system parameters which are associated with the current, past, projected or assumed (e.g., based on statistical data) operation of the system or any of its components, performance of the system or any of its components, capacity of the system or any of its components, priority of a process or services running or pending in the system, the redundancy of the system or of any of its components.

The system optimization criterion may allow optimization of the system's resource(s) while maintaining a controlled lag between the storage system's response to the corresponding incoming write command and the issuance of the respective write command to the permanent backup storage space. An example of such an optimization rule may include waiting for the amount of dirty data to reach a predefined threshold X but wait no longer than a predefined period of time T, since the last response to a write command corresponding to any of the pending dirty data and/or since the initiation of any of the pending write commands.

It will be appreciated that the herein discussed systems may operate in different modes at different times. Some of those modes may be the ones discussed above, but clearly other modes may also be implemented at times. For example, at some situations the system may even revert to other methods known in the art, especially if some components and/or functionalities of the system are dysfunctional.

By way of example, failure of the primary storage entity 10 may lead to inability to read data required for the SSC 30 to write to the secondary storage entity 20 from the primary storage entity 10. In order to overcome this problem, the SSC 30 may support I/O on its own by applying standard LSA practice against the secondary storage 20, as will be appreciated by a person who is of skill in the art.

In an example, in the case of a failure in the primary storage entity 10, recovery of the primary storage entity 10 may require reading of data from the secondary storage entity 20 through its SSC 30 by reading the necessary data from its local storage which it uses for the LSA backup. Such reading of data may be implemented by using the metadata describing the block allocation in the local storage 20, e.g. as discussed below. In other embodiments, one may apply standard LSA read and write operations as known to someone versed in the art.

It should be noted that upon failure of the primary storage entity 10 (and possibly in other situations as well), reads and writes from the secondary storage entity 20 through its SSC 30 may be implemented through the write buffer 32, for example in implementations in which direct reading (or writing) to or from the second storage entity 20 might yield false results.

According to some embodiments, reading a certain logical block from the secondary storage entity involves obtaining from the mapping module associated with the secondary storage entity the physical storage location(s) associated with the referenced logical block and retrieving the data at the physical storage location(s).

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

I claim:

1. A storage system, comprising:
    a primary storage entity utilized for persistently storing an entire data-set;
    a secondary storage entity;
    a secondary storage controller ("SSC") responsive to a destage stream pending to be written to the second storage entity for identifying a sequential storage area on the secondary storage entity formed by non-protected locations in an extent that is sufficient to accommodate the destage stream and one or more intervening protected locations between two or more of the non-protected locations; and
    said SSC is adapted to retrieve from said primary storage entity protected data associated with the intervening protected location(s), pad the stream of data with the protected data and write the padded stream of data to said secondary storage entity as a single successive write sequence over said sequential storage area.

2. The system according to claim 1, wherein said primary storage entity is used for servicing PO's addressed to the storage system and said secondary storage entity is utilized for storing a copy of at least a portion of the data set within the first storage entity.

3. The system according to claim 1, wherein said primary storage entity is characterized by relatively fast I/O performance and said secondary storage entity is characterized by relatively slow I/O performance.

4. The system according to claim 1, wherein said primary storage entity is characterized by relatively fast I/O performance, particularly when servicing random access ("RA") I/Os, and the secondary storage entity's performance is particularly poor when servicing RA I/Os.

5. The system according to claim 1, wherein an aggregate size of said non-protected storage locations is large enough to accommodate the storage of the stream of data blocks.

6. The system according to claim 1, wherein said SSC is adapted to search for said sequential storage area ahead of a current location position or ahead of a last known position of a read/write mechanism of said secondary storage entity.

7. The system according to claim 1, wherein during normal operation of said storage system, said secondary storage entity is addressed with write requests only.

8. The system according to claim 1, wherein said SSC is configured to implement a log structured file system ("LFS") for managing data stored on said secondary storage entity.

9. The system according to claim 1, wherein said primary storage entity comprises a plurality of data retention devices and the data set is distributed across the plurality of data retention devices.

10. The system according to claim 1, wherein said primary storage entity comprises a single data retention device.

11. The system according to claim 1, wherein said secondary storage entity comprises a single data retention device.

12. The system according to claim 1, wherein said SSC is configured to position the protected data at the start or at the end of the padded stream, thereby causing the protected data to be repositioned within said secondary storage entity.

13. The system according to claim 6, wherein said SSC is adapted to search for a sequential storage area within which a density of protected data is below a certain threshold.

14. The system according to claim 5, wherein said SSC is adapted to search for a sequential storage area within which a density of protected data is lowest relative to other areas within which an aggregate size of non-protected storage locations is large enough to accommodate the storage of the stream of data blocks.

15. The system according to claim 1, wherein said SSC is adapted to conduct a search for said sequential storage area starting at any point within said secondary storage entity, and in any direction relative to a current location or a last known position of a read/write mechanism of said secondary storage entity.

16. A method for managing a multilayered storage system, the method comprising:
   identifying on a secondary storage entity a sequential storage area formed by: (a) non-protected locations in an extent that is sufficient to accommodate a destage stream that is pending to be written to the second storage entity; and (b) one or more intervening protected locations between two or more of the non-protected locations;
   retrieving protected data associated with the one or more intervening protected location from a primary storage entity that is utilized for persistently storing an entire data-set;
   padding the stream of data with the protected data; and
   writing the padded stream of data to the secondary storage entity as a single successive write sequence over the succession of physical locations.

17. The method according to claim 16, wherein the retrieving comprises retrieving the protected data from the primary storage entity which is used for servicing PO's addressed to the storage system, and wherein the writing comprises writing the padded stream of data to the secondary storage entity which is utilized for storing a copy of at least a portion of the data set within the first storage entity.

18. The method according to claim 16, wherein the retrieving comprises retrieving the protected data from the primary storage entity which is characterized by relatively fast I/O performance; and wherein the writing comprises writing the padded stream of data to the secondary storage entity which is characterized by relatively slow I/O performance.

19. The method according to claim 18, wherein the retrieving comprises retrieving the protected data from the primary storage entity which is characterized by relatively fast I/O performance, particularly when servicing random access ("RA") I/Os, and wherein the writing comprises writing the padded stream of data to the secondary storage entity whose performance is particularly poor when servicing RA I/Os.

20. The method according to claim 18, wherein the identifying comprises identifying the succession of physical locations so that an aggregate size of said non-protected storage locations is large enough to accommodate the storage of the stream of data blocks.

21. The method according to claim 16, comprising searching for said sequential storage area ahead of a current location position or ahead of a last known position of a read/write mechanism of said secondary storage entity.

22. The method according to claim 16, further comprising managing data stored on the secondary storage entity by implementing a log structured file method ("LFS").

23. The method according to claim 16, wherein the retrieving comprises retrieving the protected data from the primary storage entity that comprises a plurality of data retention devices and the data set is distributed across the plurality of data retention devices.

24. The method according to claim 16, wherein the retrieving comprises retrieving the protected data from the primary storage entity that comprises a single data retention device.

25. The method according to claim 16, wherein the writing comprises writing the padded stream of data to the secondary storage entity that comprises a single data retention device.

26. The method according to claim 16, wherein the padding comprises positioning the protected data at the start or at the end of the padded stream, thereby causing the protected data to be repositioned within said secondary storage entity.

27. The method according to claim 21, wherein the searching comprises searching for a sequential storage area within which a density of protected data is below a certain threshold.

28. The method according to claim 21, wherein the searching comprises searching for a sequential storage area within which a density of protected data is lowest relative to other areas within which an aggregate size of non-protected storage locations is large enough to accommodate the storage of the stream of data blocks.

29. The method according to claim 16, wherein the identifying comprises conducting the search for said sequential storage area starting at any point within said secondary storage entity, and in any direction relative to a current location or a last known position of a read/write mechanism of said secondary storage entity.

30. A computer readable storage medium having computer readable program embodied therein for managing a multilayered storage system, the computer readable code comprising instructions for:
   identifying on a secondary storage entity a succession of physical locations formed by: (a) non-protected locations in an extent that is sufficient to accommodate a destage stream that is pending to be written to the second storage entity; and (b) one or more intervening protected locations between two or more of the non-protected locations;
   retrieving protected data associated with the one or more intervening protected location from a primary storage entity that is utilized for persistently storing an entire data-set;
   padding the stream of data with the protected data; and
   writing the padded stream of data to the secondary storage entity as a single successive write sequence over the succession of physical locations.

31. The computer readable storage medium according to claim 30, wherein the instructions for retrieving comprise instructions for retrieving the protected data from the primary storage entity which is used for servicing I/O's addressed to the storage system, and wherein the instructions for writing comprise instructions for writing the padded stream of data to the secondary storage entity which is utilized for storing a copy of at least a portion of the data set within the first storage entity.

32. The computer readable storage medium according to claim 30, wherein the instructions for retrieving comprise instructions for retrieving the protected data from the primary storage entity which is characterized by relatively fast I/O performance; and wherein the instructions for writing comprise instructions for writing the padded stream of data to the secondary storage entity which is characterized by relatively slow I/O performance.

33. The computer readable storage medium according to claim 32, wherein the instructions for retrieving comprise instructions for retrieving the protected data from the primary storage entity which is characterized by relatively fast I/O performance, particularly when servicing random access ("RA") I/Os, and wherein the instructions for writing comprise instructions for writing the padded stream of data to the secondary storage entity whose performance is particularly poor when servicing RA I/Os.

34. The computer readable storage medium according to claim 30, wherein the instructions for identifying comprise instructions for identifying the sequential storage area so that an aggregate size of said non-protected storage locations is large enough to accommodate the storage of the stream of data blocks.

35. The computer readable storage medium according to claim 30, wherein the computer readable code comprising instructions for searching for said sequential storage area ahead of a current location position or ahead of a last known position of a read/write mechanism of said secondary storage entity.

36. The computer readable storage medium according to claim 30, wherein the computer readable code further comprises managing data stored on the secondary storage entity by implementing a log structured file method ("LFS").

37. The computer readable storage medium according to claim 30, wherein the instructions for retrieving comprise instructions for retrieving the protected data from the primary storage entity that comprises a plurality of data retention devices and the data set is distributed across the plurality of data retention devices.

38. The computer readable storage medium according to claim 30, wherein the instructions for retrieving comprise instructions for retrieving the protected data from the primary storage entity that comprises a single data retention device.

39. The computer readable storage medium according to claim 30, wherein the instructions for writing comprise instructions for writing the padded stream of data to the secondary storage entity that comprises a single data retention device.

40. The computer readable storage medium according to claim 30, wherein the instructions for padding comprise instructions for positioning the protected data at the start or at the end of the padded stream, thereby causing the protected data to be repositioned within said secondary storage entity.

41. The computer readable storage medium according to claim 35, wherein the instructions for identifying comprise instructions for searching for a sequential storage area within which a density of protected data is below a certain threshold.

42. The computer readable storage medium according to claim 34, wherein the instructions for identifying comprise instructions for searching for a sequential storage area within which a density of protected data is lowest relative to other areas within which an aggregate size of non-protected storage locations is large enough to accommodate the storage of the stream of data blocks.

43. The computer readable storage medium according to claim 30, wherein the instructions for identifying comprise instructions for conducting the search for said sequential storage area starting at any point within said secondary storage entity, and in any direction relative to a current location or a last known position of a read/write mechanism of said secondary storage entity.

* * * * *